US 8,863,689 B2
Oct. 21, 2014

(12) United States Patent
Kalnay et al.

(54) ANIMAL FEEDING SYSTEM (76) Inventors: John Kalnay, Cleveland, OH (US);
Edward Kalnay, Cleveland, OH (US)

( * ) Notice: Subject to any disclaimer, the term of this patent is extended or adjusted under 35 U.S.C. 154(b) by 430 days.

(21) Appl. No.: 13/208,572

(22) Filed: Aug. 12, 2011

(65) Prior Publication Data
US 2013/0036977 A1 Feb. 14, 2013

(51) Int. Cl.
*A01K 5/00* (2006.01)
*A01K 5/02* (2006.01)
*A01K 11/00* (2006.01)

(52) U.S. Cl.
CPC .................. *A01K 5/02* (2013.01); *A01K 11/006* (2013.01)
USPC ...................................... 119/51.02; 119/52.3

(58) Field of Classification Search
CPC .............................. A01K 5/025; A01K 5/0142
USPC .......... 119/51.02, 51.01, 51.11, 51.12, 51.14, 119/51.15, 51.5, 52.3, 62, 63, 61.5, 720, 119/712, 53.5, 52.4, 52.1, 57.9, 59
See application file for complete search history.

(56) References Cited

U.S. PATENT DOCUMENTS

| 3,126,870 | A  | * | 3/1964 | Matthew ...................... 119/57.9 |
| 7,395,782 | B1 | * | 7/2008 | Lindsay ..................... 119/51.02 |
| 7,426,901 | B2 | * | 9/2008 | Turner et al. ................ 119/51.02 |
| 7,685,966 | B2 | * | 3/2010 | Goehring ................... 119/51.02 |
| 7,895,973 | B1 | * | 3/2011 | Whelan ...................... 119/51.02 |

* cited by examiner

*Primary Examiner* — Kristen C Hayes (57) ABSTRACT

Systems and methods associated with feeding animals from multiple feeders are described. Example systems include a first feeder configured to allow access by a first animal when a condition allowing access is met, and a communication logic configured to communicate with at least one other feeder. At least one other feeder is configured to allow access by at least one other animal when a condition allowing access by the at least one other animal is met. The feeders may be separated to prevent the first animal from simultaneously eating from the first feeder and interfering with other animals eating from at least one other feeder. The system may include detection logic configured to detect the proximity of an animal, and to determine if a condition allowing access is met. The detection logic may include an RFID device attached to the animal and an RFID transceiver in the first feeder.

12 Claims, 7 Drawing Sheets

ANIMAL FEEDING SYSTEM

BACKGROUND

Household pets often compete for food. Domestic animals, such as cats, often crowd around feeding dishes at feeding times. Larger, more dominant cats may consume too much food, while preventing other cats from eating enough food. Dominant behavior by one cat at feeding time may cause significant stress in other cats. Cats may engage in competitive eating, further increasing their stress. Some cats may require special diets or prescription foods, while other pets in the household may not. Feeding multiple cats multiple different types of cat food while preventing other cats from eating unintended food is frequently a time-consuming chore. Pet owners may prefer to avoid the consequences of increased stress in their cats, which may include illness and unwanted behaviors by the cats. Pet owners may also feel anxiety regarding their cats' access to food. Owners may worry about one cat eating too much food and also worry that other cats are not getting enough food. Owners may feel especially strong anxiety regarding their cats' access to food while the owner is away from the home or otherwise unable to attend to the cats' feeding.

Existing animal feeders for multiple pet households restrict access to food to specific cats and specific dishes, so that only the intended cat has access to intended food stored in a specific dish intended for that cat. Existing feeders may restrict access by opening upon detection of one cat and by closing upon detection of another cat within a specified proximity. Existing feeders may restrict access by presenting an opening large enough for only one animal to enter the feeding area, thereby limiting access to specific food to a specific cat. Existing feeders may comprise several food repositories located in one base, into which different types of food may be placed, and may provide access to the different containers only upon certain conditions. Such feeders may use a rotating lid that moves between the various food repositories, alternately allowing access to one repository and not the others, depending on the position of the lid.

Existing animal feeders allow users to detect if the feeder is functional while the user is away from the home by connecting the feeder to a telephone line through a telephone answering machine, and disconnecting the answering machine if the feeder malfunctions or if the feeder detects that food levels have reached a specified level. If the user telephones the number associated with the answering machine, the failure of the answering machine to answer indicates to the user that the feeder has malfunctioned or is empty.

Existing animal feeders do not prevent one cat from pushing aside the intended cat from the intended cat's dish, thereby preventing the intended cat or both cats from eating. Feeders that permit entry to the food container through a space just large enough for one cat do not prevent another cat from interfering with the first cat while the first cat is attempting to enter the feeder and/or feed from it. For example, the interfering cat may block the entrance to the feeder. Feeders that contain multiple compartments and a lid that rotates, providing access to certain compartments to certain cats, do not prevent one cat from interfering with another cat's feeding. Feeders that open upon detection of a first cat and that close when another cat is detected do not prevent the other cat from physically pushing the first cat away from the feeder, thereby potentially depriving both cats of the food.

Existing feeders do not actively alleviate remote users' anxiety regarding their cat's feeding, because they do not communicate with a remote user to notify the user of successful cat feeding events. Rather, existing feeders require the user to initiate the contact with the feeder by making a telephone call. Also, existing feeders that depend on a sensor to detect food or water levels inside the food or water compartments of the feeder create another opportunity for a failure in the feeding system, where the sensor may malfunction or misread the food or water level. In particular, wet cat food may obscure the sensor or cause a sensor to report that the container is full when in fact the container is substantially empty but a small amount of wet food has adhered to the sensor, effectively spoofing the sensor. Existing feeders may therefore lead the user to incorrectly believe the feeder has malfunctioned, when in fact just the answering machine has malfunctioned or the power supply to the answering machine has failed, thereby increasing user anxiety. Existing feeders may similarly lead a user to falsely believe the feeder is functioning correctly, when in fact the feeder is substantially empty or has malfunctioned.

Issues associated with existing feeders are exacerbated by their use in multiple pet households. For example, different existing feeders may be used to feed multiple cats, but each feeder must be configured and programmed individually. This would be time consuming if the user attempted to separate the additional feeders by a distance sufficient to prevent cats from interfering with each other's feeding. Since animal feeders are typically located on the floor, users would have to stoop to the level of the feeder for protracted lengths of time to program and configure the feeders, in addition to the time spent loading the feeders with food and/or water. Alternately, users must lift feeders potentially full of cat food and/or water, increasing the chance of spilling cat food or water. Thus, it becomes increasingly likely a user would stop using a set of existing different feeders effectively, further increasing their frustration and anxiety.

A cat may become accustomed to feeding at regular intervals. These feeding times may be dictated by the cat owner's schedule. Cats seem to anticipate their feeding time and disturb owners some time, frequently an hour or more, before the scheduled feeding time. Pets may undergo stress when they are not fed at their expected times, and may irritate their owners. Cat owners who are unable to attend to their cats for lengths of time greater than the time across several feedings frequently recruit others to feed and/or monitor their cats.

Therefore, attempts are constantly being made to improve animal feeding systems to ensure multiple animals receive the intended amount of food, and to reduce the anxiety of animal owners regarding the feeding of their animals.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Example systems and methods allow access to specific animal feeders by intended animals only. Example systems and methods reduce competitive eating and stress-inducing behavior among multiple cats by separating the animal feeders sufficiently to allow multiple animals to eat without interference from each other. Example systems and methods employ radio frequency identification (RFID) to allow detection of animals in proximity with the animal feeders, and to deny access to unintended animals. Example systems and methods employ email, text messaging, picture mail, cellular phone calls, social media updates, and dedicated software to communicate the occurrence of animal feeding events to remote users. Example systems and methods enable users to program the animal feeding system's behavior regarding the association of specific animals with specific animal feeders, user-communication methods and schedules, and animal feeding schedules.

The following includes definitions of selected terms employed herein. The definitions include various examples and/or forms of components that fall within the scope of a term and that may be used for implementation. The examples are not intended to be limiting. Both singular and plural forms of terms may be within the definitions.

LAN: local area network.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Pet" as used herein includes, but is not limited to cat, dog, rabbit, skunk, ferret, weasel, pig, mouse, and rat.

Conventionally, pet feeding systems have been devised to feed one or more animals from a single feeder. Therefore, it has been impractical to manage the feeding of multiple different cats from a single feeder where the cats exhibit dominant or competitive eating behaviors, since while the feeder may admit only one cat to the food stored in the feeder, nothing prevents other cats from disrupting the intended cat's feeding. It has been impractical to alleviate cat owners anxiety regarding the feeding of their animals while the owner is not present. Therefore, example systems and methods allow controlled feeding of multiple different cats while communicating the occurrence of feeding events to the owner. Example systems and methods employ RFID to detect cats. The RFID signals are then analyzed to determine the proximity and identity of the detected cats. In one embodiment, the data resulting from the analysis of the RFID signals are then used to control an animal feeder to allow access to the feeder.

Figure 1:
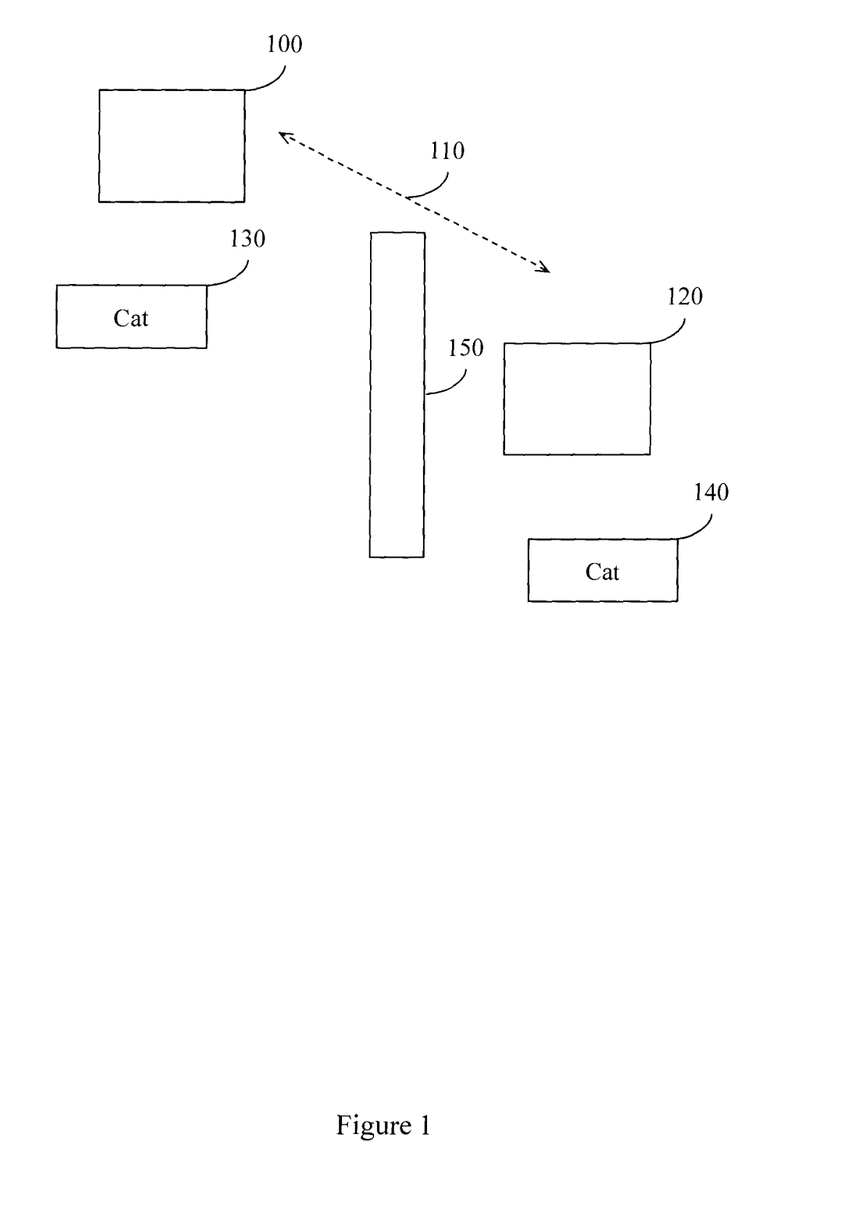
FIG. 1 illustrates an example system associated with an animal feeding system configured to allow access by a first animal to a first feeder, and at least one other animal to at least one other feeder, the feeders being separated by a first distance sufficient to prevent the first animal from interfering with the at least one other animal.

FIG. 1 illustrates an example animal feeding system. In one example, the animal feeding system comprises a first animal feeder 100 located a first distance 110 from at least one other animal feeder 120. The first distance 110 is sufficient to prevent an animal 130 from simultaneously eating from the first feeder 100 and interfering with at least one other animal 140 eating from the other animal feeder 120.

In some environments, there may be insufficient space to separate the first animal feeder 100 from the at least one other animal feeder 120 by a distance 110 sufficient to prevent the first animal 130 from interfering with other animals feeding at the second feeder 120. In such environments, it may be desirable to separate the feeders by a physical barrier 150. In one example, the first animal feeder 100 may be separated from the at least one other animal feeder 120 by a physical barrier 150 sufficient to prevent a cat 130 from simultaneously eating from the first feeder 100 and interfering with at least one other animal 140 eating from the other animal feeder 120. The physical barrier 150 may be, for example, a wall, a floor, a door, a fence, or a piece of furniture.

Animal feeder 100 may be configured to allow access to animal feeder 100 by a first animal 130 when a condition to allow access by animal 130 is met. The condition to allow access by the first animal 130 may include: the first animal 130 being within a first proximity of the animal feeder 100, the proximity of at least one other animal 140 to the feeder 100, the receipt of a signal from a computing device that a time to allow access has arrived, and the proximity of at least one other different animal 140 to at least one other feeder 120.

Animal feeder 100 may be configured to communicate with at least one other animal feeder 120 to facilitate coordinating at least one action between the first animal feeder 100 and the at least one other animal feeder 120. In one example, the first animal feeder 100 may communicate to the at least one other animal feeder 120 that the condition to allow a first animal 130 access to the first animal feeder 100 has been met. In this way, access to feeder 100 by animal 130 may be coordinated with access to feeder 120 by animal 140.

Figure 2:
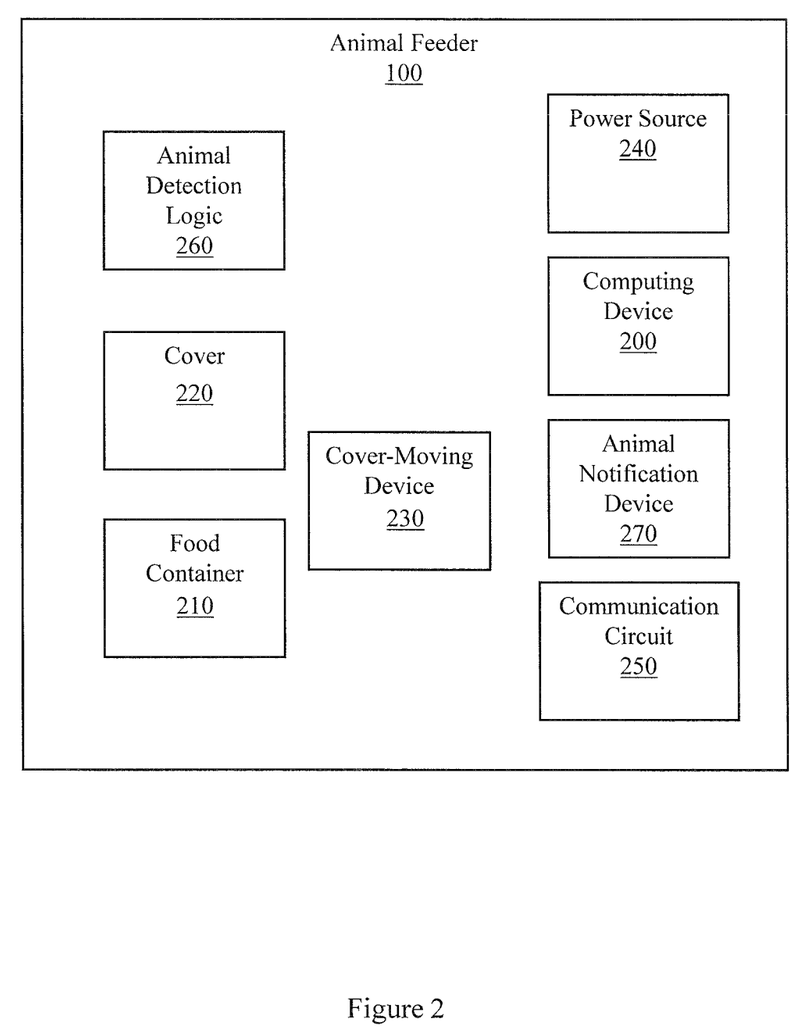
FIG. 2 illustrates an example embodiment of an animal feeder.

FIG. 2 is a block diagram of another example animal feeder 100. In one example, animal feeder 100 may comprise a computing device 200, a food container 210, a cover 220 operably coupled to the food container 210, a cover-moving device 230 operably coupled to the cover 220, a power source 240, a communication circuit 250, an animal detection logic 260, and an animal notification device 270.

Animal feeder 100 may include a computing device 200. Computing device 200 may be configured to store on a computer readable medium a set of data related to the feeding of animals. In one example, the data may include unique identifiers associated with specific RFID tags and specific animal feeders, feeding schedules, histories of animal feeding events, image files of animal feeding events, and numbers and locations of at least one other animal feeder. Computing device 200 may be configured to allow a user to alter the data stored in computing device 200. In one example, computing device 200 is configured with an input/output device enabling the user to adjust the operational parameters of the feeding system, including associating specific RFID tags with specific animals and specific animal feeders. In one example, the input/output device comprises a keypad and an LCD display. Computing device 200 may be configured to allow the user to adjust the fail-safe settings of a fail-safe logic. The user may be allowed to set the fail-safe logic to control the animal feeder to move the cover 220 to the open position upon detection of a fail-safe event, or to move the cover 220 to the closed position upon detection of a fail-safe event.

Computing device 200 may be configured to enable a user to interact remotely with the animal feeding system through the communication circuit 250 by a remote electronic device. In one example, computing device 200 is configured to allow the user to configure computing device 200 from a personal computer located on the same LAN as the animal feeding system. In another example, a user may interact with the animal feeding system by a Personal Electronic Device (PED) such as a smart phone.

Animal feeder 100 may include at least one food container 210. Food container 210 may be coupled to a cover 220. Cover 220 may be moveable between a closed position and an open position. Food in the food container 210 is inaccessible to the animal when the cover 220 is in the closed position. Food in the container 210 is accessible to the animal when the cover 220 is in the open position. Animal feeder 100 may also include a cover-moving device 230. Cover-moving device 230 is operably connected to the cover 220. Cover-moving device 230 may, upon receipt of a signal from computing device 200, move the cover 220 from the closed position to the open position, and from the open position to the closed position. In one example, cover-moving device 230 is an electric motor.

Animal feeder 100 may include a power source 240. In one example, power source 240 is a battery. In another example, power source 240 is connected to an AC outlet. Power source 240 is configured to allow the user to turn off the animal feeding system as desired, for example, to reduce use of electricity or to preserve battery life.

In one example, power source 240 comprises a primary power supply and a backup power supply. Pet owners often worry about how their pets will endure a power outage. Existing animal feeders that draw power solely from an AC outlet may not function in a power outage. Existing animal feeders that operate on batteries may not inspire confidence in their users that they will provide power until the user returns to replace the batteries. Example systems and methods incorporate a backup power supply to enable the operation of a fail-safe logic. In one example, the backup power supply may be a battery. In one example embodiment, the backup power supply is configured to provide power to the feeder 100 sufficient for the fail-safe logic to operate, in the event of a failure of the primary power supply.

Figure 3:
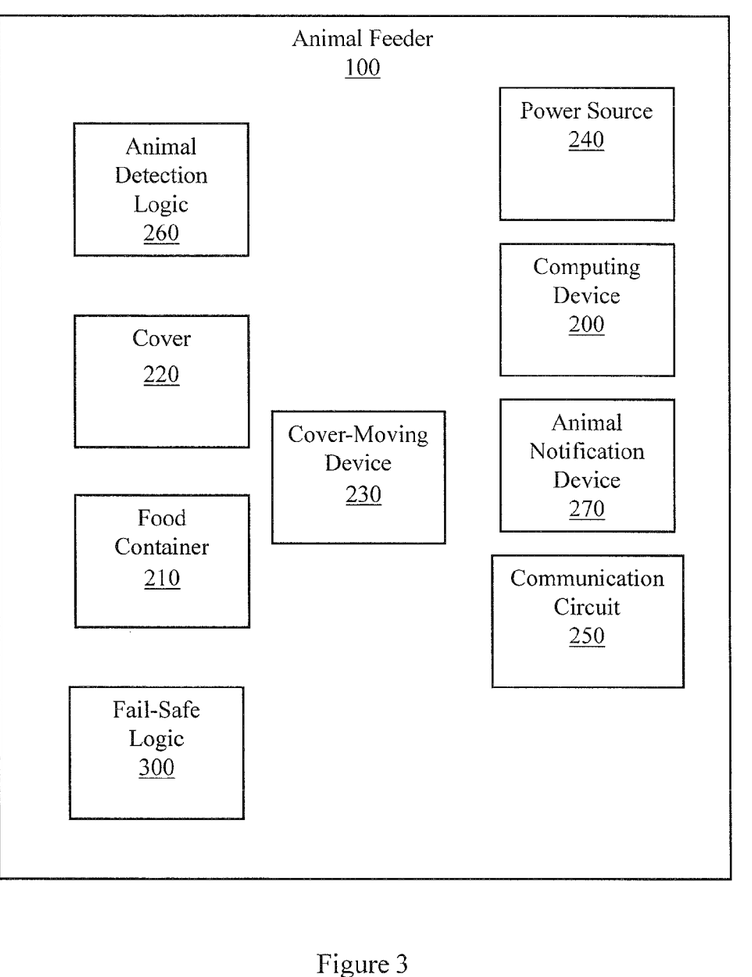
FIG. 3 illustrates an example embodiment of an animal feeder.

FIG. 3 is a block diagram of another example animal feeder 100. This example of animal feeder 100 may include a fail-safe logic 300. The fail-safe logic 300 may be configured to control the feeder 100 to move the cover 220 to the open position, or to maintain the cover 220 in the open position, upon a failure or impending failure of the primary power supply. Pet owners may wish to ensure their pets have access to food in the event of a power outage. For example, a pet owner may be delayed in returning home due to an ice storm, and may worry that their pets will not have access to the food in their feeders because the ice storm has disrupted the power to their home. In one example, fail-safe logic 300 operates to detect disruptions to the primary power supply. Fail-safe logic 300 may be configured so that in the event of a power disruption, fail-safe logic 300 may control the feeder 100 to move the cover 220 to the open position, or to maintain the cover 220 in the open position. Fail-safe logic 300 may also be configured to control the feeder 100 to draw power from the backup power supply instead of the primary power supply, in the event of a disruption of power to the primary power supply.

Figure 4:
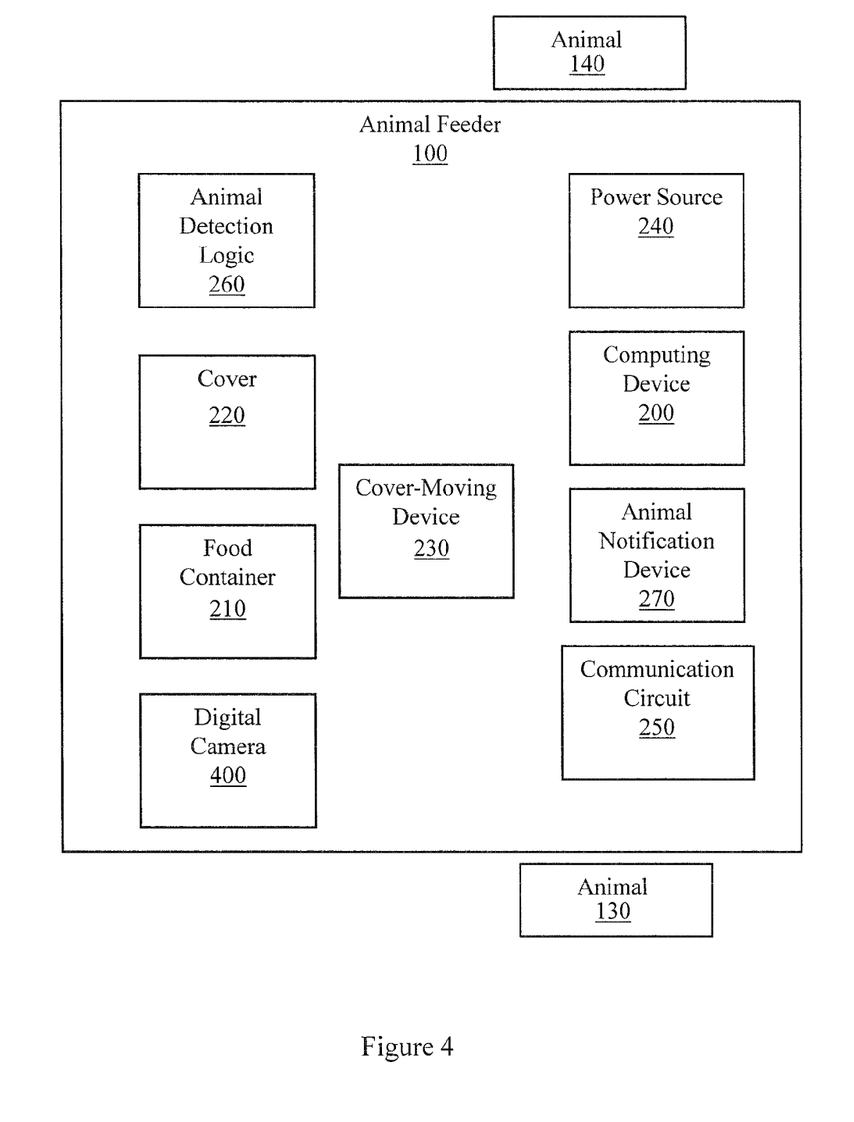
FIG. 4 illustrates an example embodiment of an animal feeder.

FIG. 4 is a block diagram of another example animal feeder 100. Animal feeder 100 may include a digital camera 400. Users may wish to have visual evidence of their animals feeding at the animal feeder 100. The digital camera 400 may be configured to receive a signal from the animal detection logic 260 indicating that an animal 130 has been granted access to the feeder 100. The digital camera 400 may be configured to then take a digital photograph of the animal 130. Digital camera 400 may be operably coupled to computing device 200. Through computing device 200, the user may be able to control operation of the digital camera 400. For example, the user may be able to control the frequency with which images are taken, the resolution of the images, and of what animals images are taken. In one example, digital camera 400 may be detachable from the feeder 100. In another example, digital camera 400 may be fixed to feeder 100. In one example, digital camera 400 may draw power from its own power source. In another example, digital camera 400 may draw power from power source 240.

Animal feeder 100 may include a communication circuit 250 operable to communicate with at least one other animal feeder 120. In one example, communication circuit 250 may be configured to enable the animal feeders 100 and 120 to communicate via a wireless network. Animal feeder 100 may communicate a signal to the at least one other animal feeder 120 that a feeding event has occurred. Animal feeder 100 may communicate a signal to the other feeder 120 that scheduled feeding time has occurred along with a command to open the other feeder 120. In another example, the animal feeders 100 and 120 may communicate via a wired network. In another example, the animal feeders 100 and 120 may be connected by a network cable through which they are configured to communicate.

Communication circuit 250 may be configured to allow users to interact with the animal feeding system by connection to remote devices. In one example, communication circuit 250 may be configured to connect the animal feeding system to a local wireless network. For example, a user may configure the animal feeding system to be detectable by their home wireless network. The user may then access and control the animal feeding system from a personal computer located on their home network. In another example, the user may configure the communication circuit 250 to allow communication between the animal feeding system and a PED. For example, a user may configure the animal feeding system to be accessible by smart phone. The smart phone may store a specific application on a computer readable medium to control the animal feeding system. By enabling users to connect with and control the animal feeding system from a remote device, example systems and methods allow the user to control the operational parameters of the system remotely, reducing the need for the user to physically attend to multiple feeders to adjust their operation.

Animal feeder 100 may include an animal detection logic 260. Animal detection logic 260 may determine the presence of at least one animal 130 within a first proximity to the animal feeder 100. Animal detection logic 260 may provide a signal associated with the meeting of a condition to allow access by the first animal 130 to the animal feeder 100, based in part on determining the proximity of the first animal 130 to the animal feeder 100. In one example, animal detection logic 260 may provide a signal to the cover-moving device 230 that a condition to allow access by the first animal 130 to the feeder 100 is met. Animal detection logic 260 may also determine that a condition to allow access to the feeder 100 is not met. In one example, animal detection logic 260 may detect the proximity of animal 130 and animal 140 to feeder 100. The proximity of animal 140 may in this example override the condition that would otherwise allow animal 130 access to feeder 100, and instead send a signal to the cover-moving device 230 to move the cover 220 to the closed position, or to maintain the cover 220 in the closed position.

Figure 5:
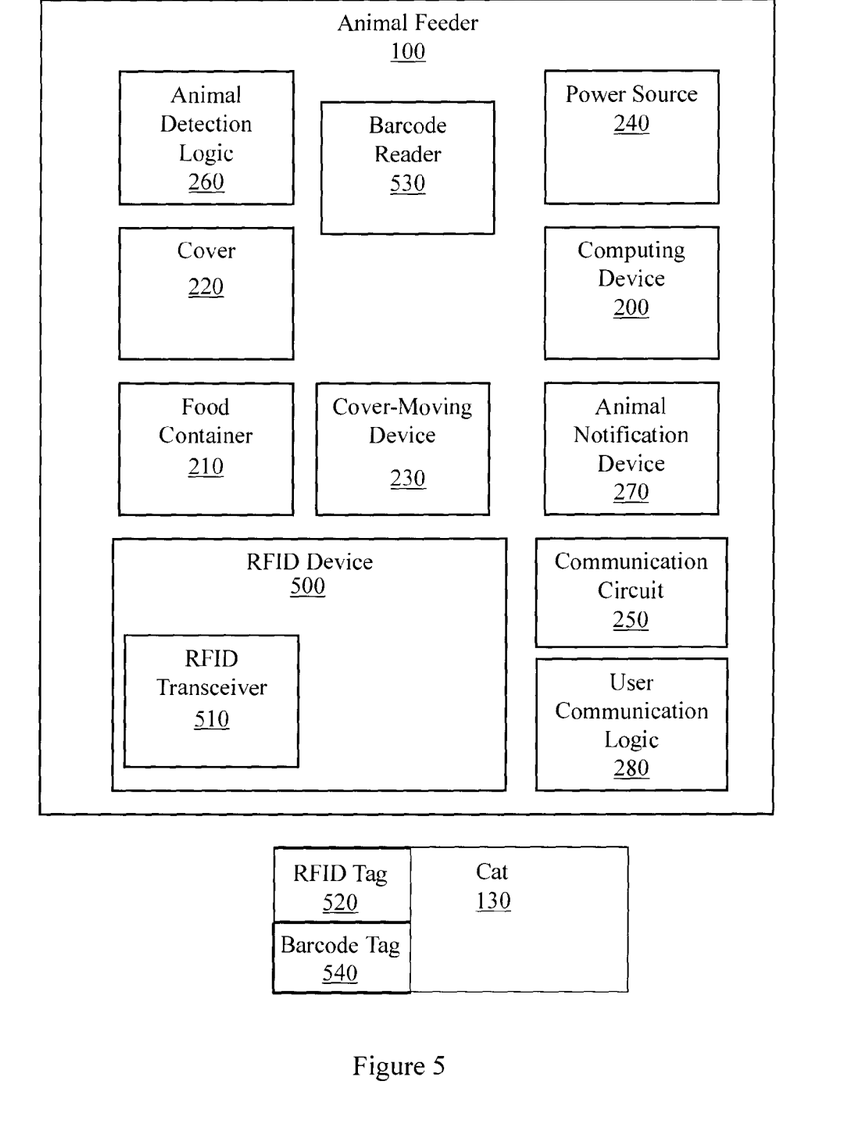
FIG. 5 illustrates an example embodiment of an animal feeder.

FIG. 5 is a block diagram of another example animal feeder 100. Animal detection logic 260 may comprise an RFID device 500. In one example, the RFID device 500 is a passive RFID device, comprising an RFID transceiver 510 located in animal feeder 100 and at least one RFID tag 520 located separately from the transceiver 510. The RFID tag 520 is attachable to the animal 130. In one example, RFID tag 520 is attachable to an animal collar affixed to the animal 130. In another example the RFID tag 520 is implanted in the animal 130.

A person of ordinary skill in the art will appreciate that animal detection logic 260 may use technologies other than RFID for detecting animals. In one example, a facial recognition device may be used. Upon detection of cat 130 within a first proximity of the feeder 100, the animal detection logic 260 controls a digital camera to take a digital image of the cat 130. Animal detection logic 260 then analyzes the image. Upon determining that the cat 130 in the image analyzed is to be allowed access to the feeder 100, the animal detection logic 260 may then control the feeder 100 to allow access. Facial recognition allows one embodiment where nothing needs to be attached to the animal 130 to identify the animal 130.

In another example, a two dimensional (2D) barcode reader 530 may be used by the animal detection logic 260. The 2D barcode reader 530 is located on the feeder 100 and the barcode 540 is affixed to the animal 130. 2D barcode reading allows the use of a digital camera to read the barcode, rather than the lasers typical of conventional barcode readers. In one example, the 2D barcode reading camera also functions as the camera used to record animal feeding events.

Animal feeder 100 may include an animal notification device 270. Animals often respond to noises indicating their feeding time is occurring. For example, dogs may come running when the owner utters the phrase "supper time" and cats may congregate at an owner's feet upon the sound of the owner opening a can of cat food, or even upon hearing the owner walking towards the feeding area. When animal detection logic 260 detects the proximity of a first cat 130 and determines that a condition to allow access to the feeder 100 by the first cat 130 is met, animal feeder 100 may communicate a signal to another animal feeder, signaling the other animal feeder to control the cover-moving device of the other feeder to move to the open position. The signal may also contain a command to the other animal feeder to emit a noise associated with an animal feeding event audible to other animals within hearing distance of the other feeder. For example, the noise emitted by the animal notification device 270 may be a recording of the sound of a can opening, or of a dinner bell ringing. In this manner, while the first cat 130 is feeding at the first animal feeder 100, the second cat 140 is notified that that the second animal feeder is available for feeding, and so the second cat 140 may be encouraged to travel to the second feeder and to not travel to the first feeder 100 while the first cat 130 is at the first feeder 100. In one example, animal notification device 270 is a speaker located in the animal feeder 100. Animal notification device 270 may be configured to allow the user to control the volume of the sound emitted, the type of sound emitted, the conditions for emitting a sound, or whether any sound is emitted.

Animal feeder 100 may include a user-communication logic 280. The user-communication logic 280 may be configured to communicate to a user the occurrence of an animal feeding event. Pet owners often worry about whether their pets are eating enough while the owners are away from their pets. Pet owners may wish to have confirmation that their pets are eating while the owner is, for example, away at work. User communication logic 280 may be configured to communicate to the user the occurrence of an animal feeding event by at least one of: email, text message, picture mail, cellular phone call, and social media updates. User communication logic 280 may be configured to alter the rate and frequency at which communications with the user are initiated. In one example, a user may configure the user communication logic 280 to send a text message upon the occurrence of every feeding event involving their cat Doc. In another example, the user may configure the user communication logic 280 to send an email only after their other cat Wesley has fed at least three times.

Example methods may be better appreciated with reference to flow diagrams. While for purposes of simplicity of explanation, the illustrated methods are shown and described as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. Blocks may be combined or separated into multiple components. Furthermore, additional and/or alternative methods can employ additional, not illustrated blocks.

Figure 6:
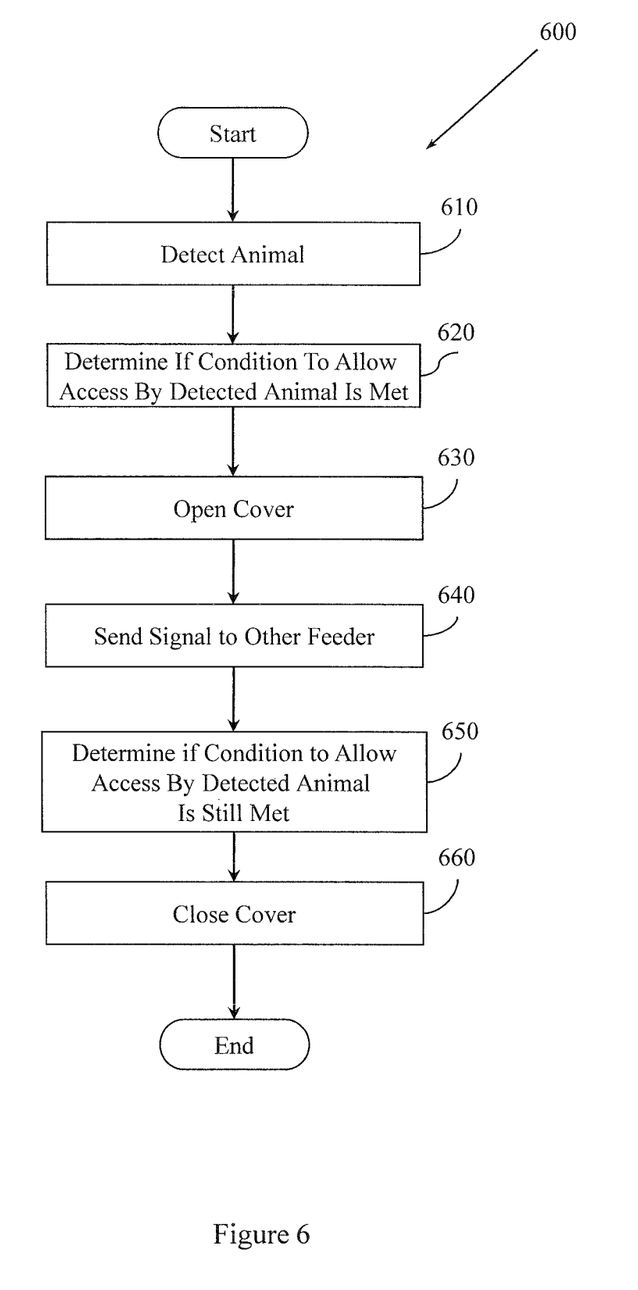
FIG. 6 illustrates an example method associated with an animal detection logic.

FIG. 6 illustrates an example method 600 associated with animal feeding. Method 600 may be performed by an animal detection logic located in an animal feeder. In one example, method 600 may determine whether an animal is detected within a first proximity of the feeder and if a condition to allow access to the feeder is met.

Method 600 includes, at 610, determining if an animal is detected within a proximity of the feeder. In one example, method 600 may use RFID to detect animals within a proximity of the feeder. In another example, method 600 may use 2D barcode reading to detect animals. In another example, method 600 may use facial recognition technology to detect animals.

Upon determining that an animal has been detected, method 600, at block 620, determines if a condition is met to allow the detected animal access to the feeder. In one example, the condition to allow access to the first feeder comprises the detection by the feeder of a first cat associated with a specific RFID tag. In another example, the condition to allow access may comprise the detection of a first cat associated with a specific RFID tag, and the non-detection of any other cats within a first proximity. In another example, the condition may be the detection of a first cat, and the determination by an animal detection logic that the current time is within a user-defined range of feeding times.

Upon determining the detected animal is to be allowed access, method 600, at 630, controls the cover-moving device of a feeder to move the cover from the closed position to the open position, thereby allowing the animal access to the food container.

Method 600, at 640 sends a signal to at least one other feeder indicating that access has been granted at the first feeder. In one example, the at least one other feeder, upon receiving the signal sent by the first feeder, controls the cover-moving device of the at least one other feeder to move the cover of the at least one other feeder to the open position. The at least one other feeder may also, upon receipt of the signal from the first feeder, control the animal notification device of the at least one other feeder to emit a sound audible to at least one other animal.

Method 600, at 650, waits a first period of time and then checks if the condition to allow access to a feeder by the first animal is still met. If the condition is no longer met, method 600 at 660 controls the cover-moving device to move the cover of the first feeder to the closed position. In one example, the second animal feeder checks at 650 if there is an animal detected at the second feeder. If no animal is detected at the second feeder, the second feeder moves its cover to the closed position. In one embodiment, the first animal feeder controls the second animal feeder to perform the steps just described.

Figure 7:
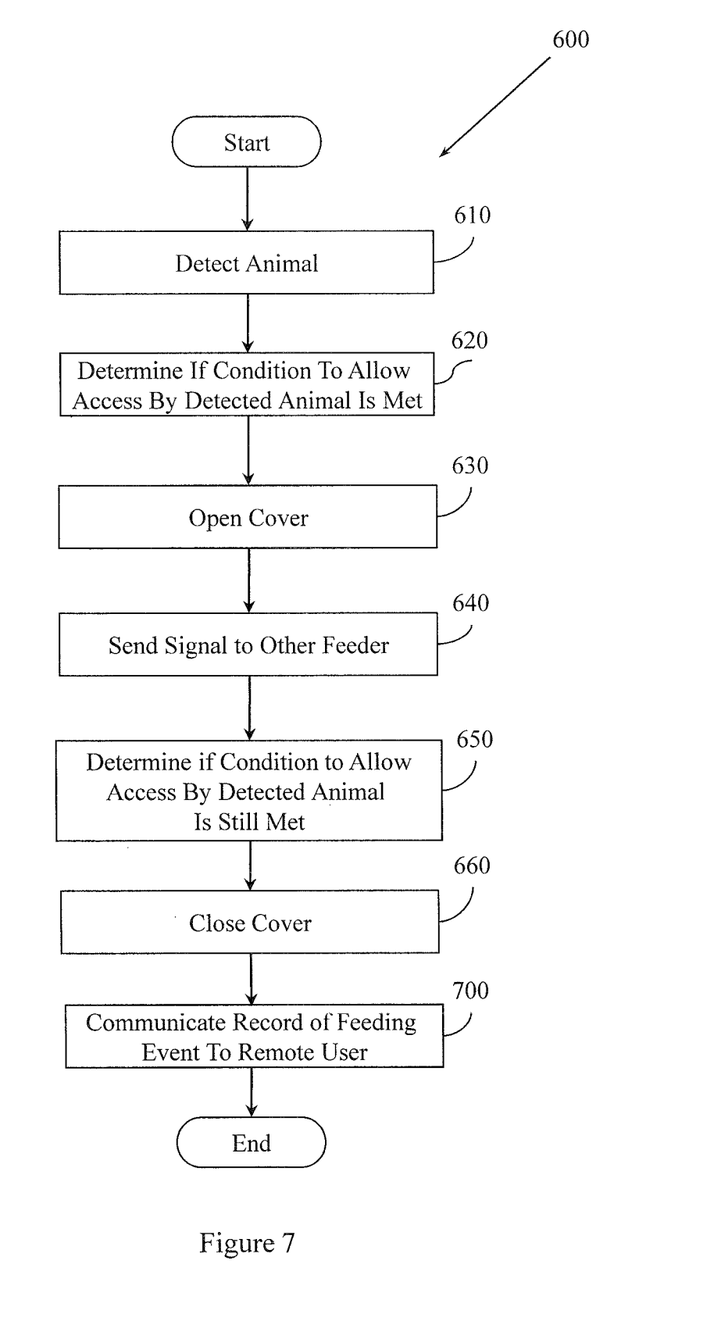
FIG. 7 illustrates an example method associated with an animal detection logic.

FIG. 7 illustrates another example of method 600, comprising controlling a communication circuit to communicate with a remote user a record of the occurrence of an animal feeding event. Method 600 includes, at 700, communicating to a user the occurrence of an animal feeding event. In one example, method 600 may send a text message to a user upon the occurrence of every feeding event of a first cat. In another example, method 600 may send an email to a user after the occurrence of every third feeding event of a second cat.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

The invention claimed is:

1. An animal feeding system, comprising:
   at least two animal feeders, a first animal feeder being configured to be separated from at least one other animal feeder by a first distance, the first distance being sufficient to prevent a first animal from simultaneously eating from the first feeder and interfering with at least one other animal eating from the at least one other feeder;
   the first animal feeder being configured to allow access to the first animal feeder by a first animal when a condition to allow access by the first animal is met, and to communicate with at least one other animal feeder different from the first animal feeder to facilitate coordinating at least one action between the first animal feeder and the at least one other animal feeder;
   the at least one other animal feeder being configured to allow access by at least one other animal different from the first animal when a condition to allow access by the at least one other animal is met, and to communicate with the first animal feeder to facilitate coordinating at least one action between the first animal feeder and the at least one other animal feeder,
   where an animal feeder comprises:
   a computing device;
   a food container;
   a cover coupled to the food container, the cover being moveable between a closed position and an open position, the food container being inaccessible to an animal when the cover is in the closed position, the food container being accessible to the animal when the cover is in the open position;
   a cover-moving device operably coupled to the cover, the cover-moving device being operable, in response to a signal from the computing device, to move the cover from a closed position to an open position, and from an open position to a closed position;
   a power supply;
   a communication circuit operable to communicate with at least one other animal feeder;
   an animal detection logic; and
   an animal notification device.

2. The system of claim 1, where the communication circuit is configured to communicate with the at least one other animal feeder using wireless communication.

3. The system of claim 1, comprising a user communication logic, the user communication logic being operable to communicate with a remote user by one or more of, email, text message, picture mail, cellular phone call, and social media updates.

4. The system of claim 1, comprising a fail-safe logic, the fail-safe logic being configured to detect a loss of power to the animal feeding system, and to cause the cover to move to the open position upon detection of a loss of power to the animal feeding system.

5. The system of claim 1, comprising a digital camera, the digital camera being configured to record an image of the animal accessing the animal feeding system upon the access of the animal feeding system by the animal.

6. The system of claim 1, the animal detection logic comprising:
   at least one RFID transceiver located in the first animal feeder;
   at least one RFID tag, the RFID tag comprising, a unique identifier associated with the animal feeder;
   the RFID tag being attached to the first animal.

7. The system of claim 1, the animal detection logic comprising:

a two-dimensional barcode reader located in the first animal feeder; and
a two-dimensional barcode tag, the tag comprising:
a two-dimensional barcode; and
a unique identifier associated with the tag;
the tag being attachable to the first animal.

8. The system of claim 1, the power source comprising:
a primary power supply, and;
a backup power supply.

9. The system of claim 1, the computing device being configured to store information on a history of feeding events.

10. The system of claim 1, the computing device being configured to store information on the feeding of the animals, the information including the association of at least one RFID tag with at least one animal feeder, conditions to allow access by the at least one animal, fail-safe conditions, and feeding schedules.

11. The system of claim 1, the computing device comprising an input/output device, the input/output device being configured to allow the user to change the information stored on the computing device.

12. An animal feeding system, comprising:
at least two animal feeders;
means for detecting a first animal within a first proximity of the first animal feeder;
means for controlling the first animal feeder to allow access by the first animal to the first animal feeder upon determining if a condition to allow access by a first animal to the first animal feeder is met;
means for communicating the access by the first animal to the first animal feeder to the at least one other animal feeder;
means for controlling the at least one other animal feeder to emit a signal detectable to the second animal;
means for controlling the at least one other animal feeder to allow access by the at least one other animal to the at least one other animal feeder;
means for recording an image of an animal feeding event;
means for communicating the occurrence of an animal feeding event to the user;
means for detecting a loss of power to the animal feeding system; and,
means for allowing access to the animal feeding system upon detection of a loss of power to the animal feeding system.

* * * * *